Nov. 13, 1951 S. TESZNER 2,575,200

ULTRAHIGH-FREQUENCY PULSE OSCILLATOR

Filed Jan. 21, 1948 3 Sheets-Sheet 1

INVENTOR
STANISLAS TESZNER
By:
Haseltine, Lake & Co.
AGENTS

Nov. 13, 1951 S. TESZNER 2,575,200

ULTRAHIGH-FREQUENCY PULSE OSCILLATOR

Filed Jan. 21, 1948 3 Sheets-Sheet 2

INVENTOR
STANISLAS TESZNER
By: Haseltine, Lake & Co.
AGENTS

Nov. 13, 1951 S. TESZNER 2,575,200

ULTRAHIGH-FREQUENCY PULSE OSCILLATOR

Filed Jan. 21, 1948 3 Sheets-Sheet 3

INVENTOR
STANISLAS TESZNER
By: Hazeltine, Lake & Co.
AGENTS

Patented Nov. 13, 1951

2,575,200

UNITED STATES PATENT OFFICE 2,575,200

ULTRAHIGH-FREQUENCY PULSE OSCILLATOR

Stanislas Teszner, Paris, France

Application January 21, 1948, Serial No. 3,650
In France January 28, 1947

10 Claims. (Cl. 250—36)

The object of the present invention is a novel circuit for high frequency pulse oscillators, more especially adapted to pulse transmitters operating at ultra high frequencies corresponding to wave lengths of the order of magnitude of a few centimeters or, at most, a few decimeters and wherein high frequency oscillating energy is produced in the form of pulses of very short duration.

In my copending application for patent of the United States, Serial No. 3,649, filed January 21, 1948 entitled "Improvements in Modulators for Pulse Transmitters," I have disclosed improvements in modulators operating through the application of compound electronic semi-conductors and more particularly through the use of the electric hysteresis of such semi-conductors in order to obtain a desired shape of pulse or pip.

My present invention has for its object the extension of such an application to oscillators for pulse transmitters, according to which electric hysteresis is used no longer for the obtention of a desired shape of pip but for ensuring the oscillation of the oscillators under the best conditions of energy efficiency.

This application is of particular interest for very high frequency such as for waves of a few centimeters or decimeters and for very short durations of the pip for which the effect of hysteresis may be easily increased and held out during the major part of the whole duration of the pip. The said phenomenon of electric hysteresis is in itself known and may also be better called "electric residual effect."

Such an oscillator is constituted after the manner of already known spark oscillators wherein the spark gap is replaced by a compound system of electronic semi-conductors arranged in accordance with my invention. These compound electronic semi-conductors are constituted by semi-conductive grains, for instance Carborundum grains, which as a rule are agglomerated by means of an auxiliary compound such as clay, the mixture being baked at high temperature. This material is characterized by a more or less considerable variation of its conductivity as a function of the voltage applied to the terminals. Moreover, in the case of the present invention the electric hysteresis is so extended that during a rise of the voltage of the impulsion the current practically does not rise, while during a voltage drop it rises abruptly up to a limit determined by the impedance of the oscillatory circuit, when the high conductivity of the compound is maintained at least during the greater part of the pulse duration.

It is true that spark gaps have allowed, quite recently, reaching considerable peak powers with metric waves and on the other hand investigations, made some considerable time ago, have led to the production of wave trains at extremely high frequencies but such wave trains were highly damped and provided only a small peak power.

As a matter of fact, it is found that when the frequency is raised more particularly above $10^8$ periods per second, the phenomena of inertia of the spark become extremely troublesome. This inertia is both a longitudinal inertia appearing in the formation of the spark and in its restriking with a reversal of current at each alternance and a transversal inertia appearing inasmuch as the area corresponding to the spark does not follow synchronously the variation in current. The two forms of inertia produce an increase in the efficient drop of voltage in the spark and consequently a rapid damping of the oscillation and a reduction in the energy performance.

To reduce inertia, it is apparent that it is necessary to attempt on one hand an increase in the speed of displacement of the electrons through an increase in the free path of the electrons i. e. by accelerating the movement of the electrons through an increase in the gradient of potential in the striking interval and on the other hand to reduce the cross-sectional area of the spark by increasing the density of the current. Various contrivances have been proposed to said purpose.

The use of a dielectric medium constituted by compressed gas for increasing the gradient of potential in the striking interval together with the current density in the spark but reducing the freedom of movement of electrons by reason of the reduction in the free path of said electrons, has allowed reaching peak powers that are considerable for metric waves; however for higher frequencies of the order of $10^9$ and above it seems that such a contrivance cannot lead to results of any interest unless practically prohibitive pressures are resorted to.

The reduction of the spacing between electrodes to an interval corresponding to the magnitude of the free travel of electrons under atmospheric pressure constitutes theoretically an excellent solution of the problem. Unfortunately, this solution appears practically inapplicable, at least for high voltages and intense currents by reason of the unavoidable formation of conductive bridges between the electrodes.

The use of a high vacuum as a dielectric medium seems also at first of interest, but if in order to avoid any increase in the cathodic interval which would lead to a corresponding increase of the drop of voltage with reference to that obtained under atmospheric pressure, it would be necessary to limit the spacing of the electrodes to a magnitude corresponding to the cathodic interval under atmospheric pressure. This spacing of the electrodes although it is more important than in the preceding case would be still insufficient for removing the normal possibility of the formation of conductive bridges.

One is thus led to contemplate setting the electrodes permanently in contact, the contact thus provided having to be originally of high resistance and becoming as it were active with the conductivity rising suddenly after the manner of a spark resistance through the application of a voltage of corresponding value. To allow the application of such a voltage while avoiding parasitical external possibilities of striking, the contacts should be located inside a medium of high dielectric rigidity, preferably a high vacuum, so as to further the electronic emission starting from the electrode when cold. However whatever may be the medium used, it is hardly possible to obtain with a single contact high voltage nor to obtain the passage of intense currents. It would be therefore necessary to use a large number thereof in series and in parallel which leads to dimensions that are not acceptable for circuits that are to oscillate at very high frequencies.

Now a compound system of electronic semiconductors provides in practice such a system of contacts but at a microscopic scale whereby the total volume occupied remains allowable in practice, even for applications to very high frequencies.

However, it is apparent that if the characteristics of such a compound contact system are those generally sought for, to wit in the case of increasing currents the voltage does not drop, but holds out with a slight tendency to increase also, while electric hysteresis or residual electric effect is negligible, the upward stroke for the voltage current curve under rising voltage conditions coinciding substantially with the return stroke for decreasing voltages, practically no oscillation may be initiated by striking through the semi-conductor. For such an oscillation to be possible with an acceptacle energy efficiency it is necessary that for an increasing current the voltage ultimately may drop considerably with a tendency to reach a predetermined lower limit and to stay there during a large part or even the totality of the duration of the pip. On the other hand to allow a loading of the capacity of the oscillating circuit the compound system of semi-conductors should not allow the passage of a substantial current except above a certain voltage near the amplitude of the loading voltage. These results may be obtained by using and extending to a maximum the electric hysteresis of the compound of semi-conductors in accordance with the object of the invention.

The above described features and advantages will be better understood by the reading of the following description which discloses a few examples of diagrams of oscillating circuits including a compound semi-conductor according to the invention, reference being had to the following figures of the drawings annexed to the specification and forming part thereof.

Figure 1:
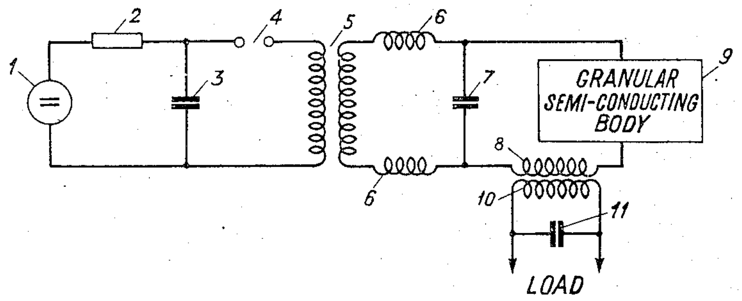
Fig. 1 is a diagram reduced to its simplest form of an oscillator according to this invention.

The diagram of the oscillator (Fig. 1) comprises a source 1 shown by way of example, as being a direct current supply, and a resistance, induction coil or the like impedance 2 adapted to load the condenser 3, forming the modulator in association with the spark gap 4 and the pip transformer 5 which latter may however be omitted. The diagram also includes the so-called choke coil 6, the capacity 7, the induction coil 8 and the compound system of electronic semiconductors 9 in the primary circuit of the oscillator cooperating with the capacity 11 and the induction coil 10 of the secondary circuit coupled with the primary circuit. The presence of a secondary circuit is however entirely optional and is only necessary when it is desired to extend the duration of the pips and also to reduce to a minimum the duration of the discharge together with the dissipation of energy in the compound semiconductor 9.

The operation of such an oscillator is readily apparent. The condenser 3 is loaded by the source 1 through the agency of the impedance 2. As soon as the desired voltage is reached, the spark gap 4 breaks down or else this breaking down is obtained through a synchronizing pulse and the voltage considered is applied suddenly through the transformer 5 if such a transformer is used, to the oscillating circuit so as to load suddenly the capacity 7. From this moment onwards, when a predetermined voltage across the terminals of the latter is reached, the oscillation of the primary circuit is initiated and is transmitted to the secondary circuit if such a circuit is used.

However, it has already been stated that for a suitable loading of a circuit with a possibility of its oscillation being developed thereafter and continuing with a good energy efficiency, it is necessary for the compound system of semi-conductors to show an extremely high resistance up to a certain value of the voltage and for said resistance to then collapse and keep a very low value during all or at least a large part of the duration of the discharge.

Figure 2:
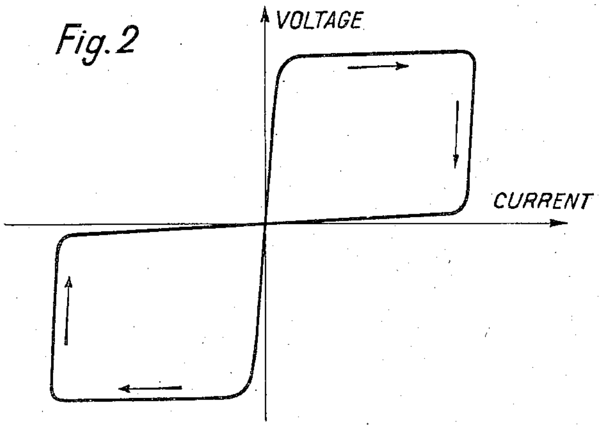
Figs. 2 and 5 show the impulse voltage current curves of semi-conductor systems with different hysteresis effects.
Figure 3:
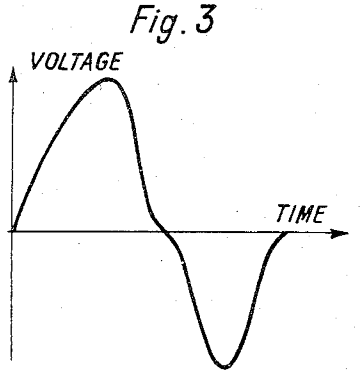
Figs. 3 and 6 show voltage-time curves across the terminals of said semi-conductors during the corresponding oscillations.
Figure 4:
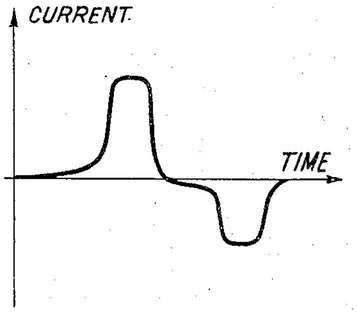
Figs. 4 and 7 are current-time curves for said corresponding oscillations.

The oscillator may be energized if the hysteresis has a considerable value, but only within the limits of each half-period. The oscillations cannot be developed except when conditions are favorable therefor. It will be seen by reference to the voltage-intensity curve of Figure 2, in which the arrows show the direction of variation of the voltage, that the compound semi-conductor returns to its original characteristic each time the voltage and the intensity pass through zero. The favorable conditions exist only during a period which is at best one quarter of a period for each half period. Referring to Figs. 3 and 4, Figure 3 of which illustrates a first period of the voltage across the terminals of the semi-conductor system and Fig. 4 of which illustrates a corresponding first period of the current, it will be seen that the oscillation is considerably damped; consequently the efficiency will be much too small.

But if such hysteresis, still remaining important extends over a considerable portion if not over the whole duration of the pip, the conditions are completely altered. The first half period or possibly the two first half periods, taking into account the two polarities, form to some extent a period of formation for the semi-conductor compound after which by reason of the hysteresis, the internal resistance will remain very small for both directions of the current. The damping of the discharge will be high only during the first or the first two half periods after which it is comparatively low.

Figure 5:
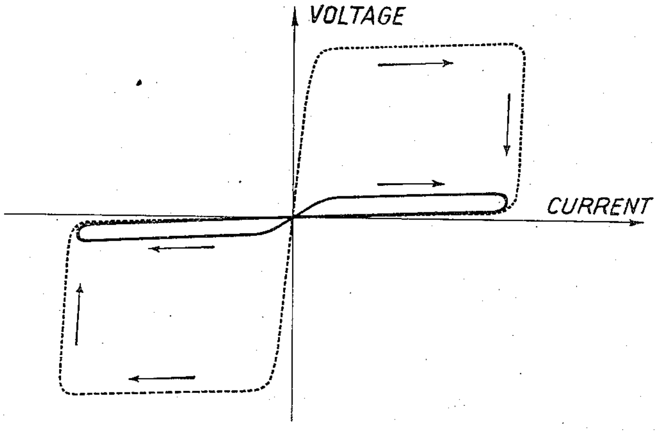
Figure 6:
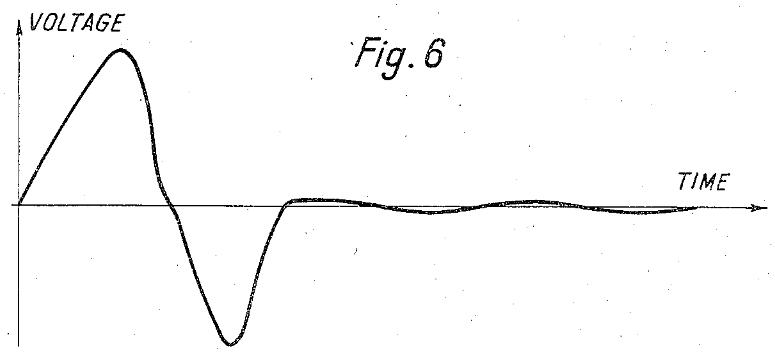
Figure 7:
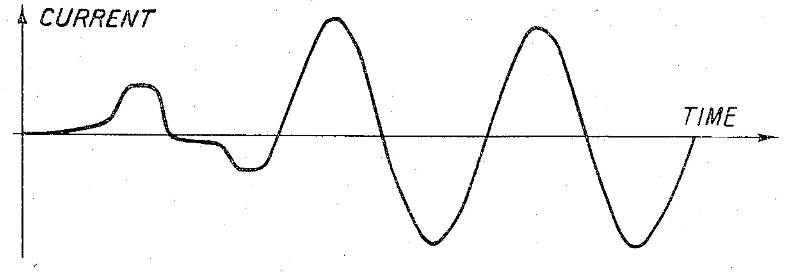

Figs. 5, 6 and 7 show respectively a voltage-current curve of the compound semi-conductor as disclosed hereinabove after a period of formation shown in chain line extending over two half-periods, the arrows illustrating the direction of variation of the voltage, a voltage-time curve across the terminals of the compound semi-conductor, and a current time curve across same the latter curves being shown for the two first half periods and a few succeeding half periods.

The remarkable fact is thus apparent that the hysteresis or residual electric effect that is extremely objectionable in the case of a spark plays in the present case a useful part. However it does not act in practice as a brake except during the initiation period producing as it were a storage of energy for the subsequent release of the discharge. Subsequently, on the contrary, the very low internal inertia appearing by reason of the microscopic size of the different insulating layers of the semi-conductor system and also of the comparatively considerable electric field prevailing therein, its effect producing a small equivalent resistance may be kept up during all or a large part of the duration of the wave train and it may be mentioned that the increase in the hysteresis phenomenon is made easier by the application of the loading voltages of the oscillator through shocks by the breaking down of the spark gap 4 as disclosed with reference to the diagram of Fig. 1.

Figure 8:
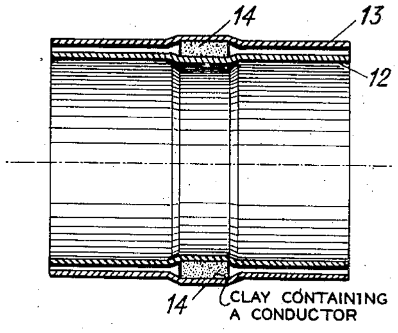
Figs. 8, 9 and 10 show diagrammatically different forms of the primary oscillators.
Figure 9:
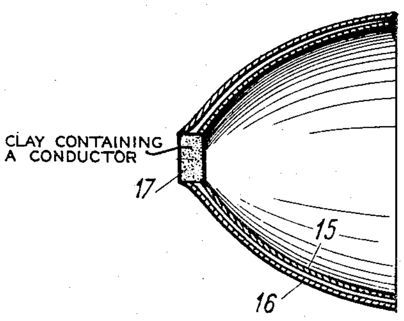
Figure 10:
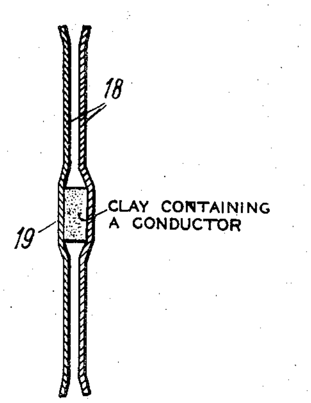

Such transmitters are capable of producing pips with peak powers that are higher not only than those of pips produced by the spark gap transmitters known to this day by reason of the comparatively very small drop in potential across the terminals of the energizing means but also than the power of the pips generated at the present time by thermo-ionic tube transmitters. As a matter of fact, they are adapted to support much higher voltages and much more intense currents. To this purpose arrangements should be taken to avoid any initiation through the outside of the electronic semi-conductor compound, by locating the system including the primary oscillator, inside a medium with a high dielectric rigidity, for instance in a high vacuum. On the other hand, as the energy produced at each pip is a result of the energy stored during the loading of the primary oscillator, the structure of the latter should be such that its electrostatic capacity may be as high as possible under conditions otherwise similar. Figs. 8, 9 and 10 show three forms of execution of such a circuit.

The circuit of Fig. 8 is a coaxial double quarter wave line constituted by an inner lead 12 and an outer lead 13 between which the loading voltage is applied while the compound electronic semi-conductor 14 is distributed annularly inside the central section of the circuit as shown in the drawing. Thus in the energization of this compound system there passes a synchronous oscillation in both halves of the circuit a quarter wave type.

If it is possible to provide for a uniform distribution of the discharge in the compound system 14, the circuit of said Fig. 8 may assume a comparatively large transverse component and produce considerable electrostatic capacities and thereby considerable stored energy even for extremely high frequencies.

In the opposite case, it is possible to prefer circuits wherein the compound semi-conductor assumes a more compact shape. This is the case for instance of the spherical lune quarter wave circuit illustrated in Fig. 9 that includes an internal lead 15, an outer lead 16 and a compound semi-conductor 17 at the apex or else of the circuit according to Fig. 10 with parallel plates 18 including at the center thereof the compound semi-conductor 19 held between the two plates. It will be noticed moreover that the circuit 10 is a mere development on a plane of the circuit of Fig. 9 allowing an easier execution thereof. Lastly the secondary circuit, if present might be constituted for instance by a cavity resonator coupled with the primary through any means known in the art.

The presence of the secondary circuit is particularly of interest when it is desired to reach not only high peak powers for each pip, but also high mean powers. As a matter of fact, it is known that a tight coupling between the primary and secondary allows a considerable shortening of the duration of discharge of the primary and consequently for a same mean power dissipated in the compound semi-conductor, the rhythm of the pips may be considerably accelerated.

From the foregoing description and functioning of the compound semi-conductor and from the description and use of the same in the co-pending application, it is obvious that different names can be appropriately applied to it, for example, it may well be called "granular semi-conducting body."

As further advantages for the transmitters including oscillators incorporating electronic semi-conductors, I may mention the simplicity of execution both for the oscillator and for the modulator as no particular shape is required for the pips except for the straight edge of the sudden voltage that is impressed on them, together with the very low wear of the arrangement and its consequently very long life.

Obviously, the diagrams and forms of execution described have been given out solely by way of examples and by no means in a limiting sense while their shapes and details of design or constitution may vary to a considerable extent without unduly widening the scope of the invention as defined in accompanying claims.

What I claim is:

1. An ultra high frequency pulse oscillator comprising, in combination a high voltage periodic pulse source producing pulses with a steep wave front, a resonant circuit including, in series, a condenser, an inductance and a granular semi-conducting body and means for causing said condenser to be charged by said pulse source and to be discharged through said inductance in series with said granular semi-conducting body, said granular semi-conducting body being made up of small grains of a semi-conducting material held together by an insulating material and having an electrical resistance decreasing with the increase of a voltage applied thereto, said decrease in said resistance occurring after a very short time interval and persisting for a time much longer than said time interval after the application of said voltage.

2. An ultra high frequency pulse oscillator in accordance with claim 1, wherein the high voltage periodic pulse source consists in a direct-current voltage source in series with an impedance and a condenser, combined with a spark gap enabling said condenser to be discharged through a pulse transformer.

3. An ultra high frequency pulse oscillator in accordance with claim 1, wherein the condenser included in the resonant circuit is constituted by the capacity between the two conductors of a coaxial double quarter wave coaxial line and wherein the granular semiconducting body is of annular shape and is inserted between and in contact with said two conductors in the central section of said line.

4. An ultra high frequency pulse oscillator in accordance with claim 1, wherein the condenser included in a resonant circuit is constituted by the capacity between two concentric hemispherical conductors and wherein the granular semiconducting body is inserted between and in contact with said two conductors in the vicniity of their apices.

5. An ultra high frequency pusle oscillator in accordance with claim 1, wherein the condenser included in the resonant circuit is constituted by the capacity between two conducting parallel plates and wherein the granular semi-conducting body is inserted between and in contact with said plates in the vicinity of their central parts.

6. An ultra high frequency pulse oscillator comprising, in combination, a high voltage periodic pulse source producing pulses with a steep wave front, a resonant circuit including, in series, a condenser, an inductance and a granular semiconductor body and means for causing said condenser to be charged by said pulse source and to be discharged through said inductance in series with said granular semi-conducting body, said granular semi-conducting body being made up of small grains of silicon carbide held together by an insulating material.

7. An ultra high frequency pulse oscillator in accordance with claim 6, wherein the high voltage periodic pulse source consists in a direct-circuit voltage source in series with an impedance and a condenser, combined with a spark-gap enabling said condenser to be discharged through a pulse transformer.

8. An ultra high frequency pulse oscillator in accordance with claim 6, wherein the condenser included in the resonant circuit is constituted by the capacity between the two conductors of a coaxial double quarter wave coaxial line and wherein the granular semi-conducting body is of annular shape and is inserted between and in contact with said two conductors in the central section of said line.

9. An ultra high frequency pulse oscillator in accordance with claim 6, wherein the condenser included in the resonant circuit is constituted by the capacity between two concentric hemispherical conductors and wherein the granular semiconducting body is inserted between and in contact with said two conductors in the vicinity of their apices.

10. An ultra high frequency pulse oscillator in accordance with claim 6, wherein the condenser included in the resonant circuit is constituted by the capacity between two conducting parallel plates and wherein the granular semi-conducting body is inserted between and in contact with said plates in the vicinity of their central part.

STANISLAS TESZNER.

REFERENCES CITED

The following references are of record in the file of this patent:

UNITED STATES PATENTS

| Number | Name | Date |
|---|---|---|
| 1,792,781 | Thilo | Feb. 17, 1931 |
| 1,949,383 | Weber | Feb. 27, 1934 |
| 2,487,279 | Stalhane | Nov. 8, 1949 |